(12) United States Patent
Guang et al.

(10) Patent No.: US 7,816,801 B2
(45) Date of Patent: Oct. 19, 2010

(54) SPEED SENSING CIRCUIT FOR A WIND TURBINE GENERATOR

(75) Inventors: Huang Tai Guang, Guangzhou (CN); Jian Fei Liu, ShenZhen (CN); Li Wen Hua, BinHe Road (CN); Brian Gaza, Naperville, IL (US); Robert Wentink, Chicago, IL (US)

(73) Assignee: International Components Corporation, Inc., Westchester, IL (US)

( * ) Notice: Subject to any disclaimer, the term of this patent is extended or adjusted under 35 U.S.C. 154(b) by 426 days.

(21) Appl. No.: 11/637,336

(22) Filed: Dec. 12, 2006

(65) Prior Publication Data

US 2007/0268002 A1    Nov. 22, 2007

Related U.S. Application Data

(63) Continuation-in-part of application No. 11/377,251, filed on Mar. 16, 2006, now Pat. No. 7,508,089.

(51) Int. Cl.
*F03D 9/00* (2006.01)
*H02P 9/04* (2006.01)
*H02P 9/00* (2006.01)

(52) U.S. Cl. ............................. 290/55; 290/44; 322/44; 322/59

(58) Field of Classification Search .................. 290/44, 290/55; 415/2.1, 4.2; 416/132 B; 322/44, 322/59
See application file for complete search history.

(56) References Cited

U.S. PATENT DOCUMENTS 4,150,301 A    4/1979    Bergey, Jr.

(Continued)

FOREIGN PATENT DOCUMENTS

GB    2186033    8/1987

(Continued)

OTHER PUBLICATIONS

Int'l Search Report.

(Continued)

*Primary Examiner*—Julio C. Gonzalez R.
(74) *Attorney, Agent, or Firm*—John S. Paniaguas; Katten Muchin Rosenman LLP

(57) ABSTRACT

A protection circuit for a wind turbine generator that includes a PWM Brake that works in conjunction with known Brake Relays is disclosed. The Brake Relay is used to short the generator output terminals at a first threshold voltage. The PWM Brake includes one or more switching devices, coupled across the generator output. The PWM Brake is under the control of a PWM Brake Control Circuit which actuates the PWM Brake at a second threshold voltage that is relatively lower than the first threshold voltage. In accordance with an important aspect of the invention, the PWM Brake Control Circuit includes a novel speed sensing circuit for providing a signal representative of the speed of the turbine generator The novel speed sensing circuit eliminates the need to mount a speed sensor on the pole top mounted turbine generator. As such, the need for adding cabling from the pole top mounted wind turbine generator is eliminated. The novel speed sensing circuit provides a signal representative of the rotational speed of the turbine generator based upon the duty cycle of a pulse width modulated (PWM) signal that is derived from the drive signal developed by the PWM Control Circuit. This signal is used to alternatively actuate and close the Brake Relay to minimize actuation of the centrifugal switch.

8 Claims, 10 Drawing Sheets

U.S. PATENT DOCUMENTS

| | | | |
|---|---|---|---|
| 4,352,629 A | 10/1982 | Cheney, Jr. | |
| 4,355,955 A | 10/1982 | Kisovec | |
| 4,427,897 A | 1/1984 | Migliori | |
| 4,456,429 A | 6/1984 | Kelland | |
| 4,483,657 A | 11/1984 | Kaiser | |
| 4,565,929 A | 1/1986 | Baskin et al. | |
| 4,692,095 A | 9/1987 | Kawson-Tancred | |
| 5,225,712 A | 7/1993 | Erdman | |
| 5,506,453 A | 4/1996 | McCombs | |
| 5,907,192 A | 5/1999 | Lyons et al. | |
| 6,256,212 B1 | 7/2001 | Wobben | |
| 6,265,785 B1 | 7/2001 | Cousineau et al. | |
| 6,541,877 B2 | 4/2003 | Kim et al. | |
| 6,566,764 B2 | 5/2003 | Rebsdorf et al. | |
| 6,703,718 B2 | 3/2004 | Calley et al. | |
| 6,809,431 B1 | 10/2004 | Schippman | |
| 6,836,028 B2 * | 12/2004 | Northrup et al. | 290/44 |
| 6,933,625 B2 | 8/2005 | Federson et al. | |
| 7,008,172 B2 | 3/2006 | Selsam | |
| 7,508,089 B2 * | 3/2009 | Guang et al. | 290/44 |
| 2002/0117861 A1 | 8/2002 | Kim et al. | |
| 2004/0219018 A1 | 11/2004 | Selsam | |
| 2005/0012339 A1 | 1/2005 | Mikhall et al. | |
| 2005/0017512 A1 | 1/2005 | Kikuchie et al. | |
| 2005/0034937 A1 | 2/2005 | Agardy et al. | |
| 2005/0042101 A1 | 2/2005 | Hun | |
| 2005/0200337 A1 * | 9/2005 | Schreiber et al. | 323/205 |
| 2005/0230979 A1 | 10/2005 | Bywaters et al. | |
| 2005/0236839 A1 | 10/2005 | Bianchi | |
| 2005/0270816 A1 | 12/2005 | Nielson | |
| 2006/0006658 A1 | 1/2006 | McCoin | |
| 2006/0012182 A1 | 1/2006 | McCoin | |
| 2006/0097519 A1 * | 5/2006 | Steinke | 290/44 |
| 2006/0192390 A1 * | 8/2006 | Juanarena Saragueta et al. | 290/44 |
| 2007/0170724 A1 * | 7/2007 | Calley | 290/44 |
| 2007/0200348 A1 * | 8/2007 | Ichinose et al. | 290/44 |
| 2007/0216165 A1 * | 9/2007 | Oohara et al. | 290/44 |
| 2007/0246943 A1 * | 10/2007 | Chang et al. | 290/44 |
| 2008/0093854 A1 * | 4/2008 | Bucker et al. | 290/44 |
| 2009/0167095 A1 * | 7/2009 | Rivas et al. | 307/87 |
| 2009/0243296 A1 * | 10/2009 | Letas | 290/44 |
| 2009/0250931 A1 * | 10/2009 | Schubert et al. | 290/44 |

FOREIGN PATENT DOCUMENTS

| | | |
|---|---|---|
| JP | 2000-179446 | 6/2000 |
| JP | 2002-315395 | 10/2002 |
| SE | 521083 | 9/2003 |

OTHER PUBLICATIONS

Energy Networks Association, *Engineering Recommendation G83/1*, Sep. 2003, *Recommendations for the Connection of Small-Scale Embedded Generators (Up to 16 A Per Phase) in Parallel with Public Low-voltage Distribution Networks*. London, W2 2HH, pp. 1-63.

* cited by examiner

WindSave Turbine Over Speed Detection Software Flowchart

SPEED SENSING CIRCUIT FOR A WIND TURBINE GENERATOR

CROSS REFERENCE TO RELATED APPLICATIONS

This application is a continuation-in-part of U.S. patent application Ser. No. 11/377,251, filed on Mar. 16, 2006 now U.S. Pat. No. 7,508,089, hereby incorporated by reference.

BACKGROUND OF THE INVENTION

1. Field of the Invention

The present invention relates to a protection circuit for a wind turbine generator and more particularly to a PWM Brake Control Circuit with novel speed sensing.

2. Description of the Prior Art

Wind turbine generator systems are generally known in the art. Examples of such systems are disclosed in U.S. Pat. Nos. 4,565,929; 5,506,453; 5,907,192; 6,265,785; and 6,541,877. Such wind turbine generator systems are also described in U.S. Patent Application Publication Nos. US2002/0117861; 2005/0034937; 2005/0230979; 2005/0236839; 2006/0006658; and 2006/0012182. Such wind turbine generator systems are known to include pole mounted turbine generators. The wind turbine generator systems also include an inverter and protection circuitry.

Due to the ever-increasing demand and increasing cost for electrical power, renewable energy sources, such as wind turbine generator systems, are becoming more and more popular for generating electrical power. Such wind turbine generator systems are known to be used individually to generate supplemental or excess power for individual, residential or light industrial users to generate electrical power in the range of 1-2 kw. Such wind turbine generator systems are also known to be aggregated together, forming a wind turbine generator farm, to produce aggregate amounts of electrical power. It is also known that unconsumed electrical power generated by wind turbine generators is connected to the utility power grid.

Such wind turbine generators are known to include a wind turbine, which includes a plurality of turbine blades connected to a rotatable shaft. The rotatable shaft is rigidly connected to a direct current (DC) generator. Wind causes rotation of the wind turbine which acts as the prime mover for a DC generator. The generator, for example, a self-excited generator, generates DC electrical power.

One problem with such systems is that wind speeds are not constant. As is known in the art, the voltage output of the generator is a cubic function of the speed of the speed of the wind. As such, the effect of wind gusts on the wind turbine generator must be controlled to prevent damage to the wind turbine generator.

Some wind turbine generator systems are known to use some type of mechanical braking to protect the wind turbine generator from an over speed condition. For example, U.S. Pat. No. 5,506,453 utilizes the pitch of the wind turbine blades to protect the wind turbine from over speed. In particular, the blades of the wind turbine are mechanically coupled to a rotatable mechanical hub. The blades are configured so as to be rotatable about their longitudinal axis relative to the hub allowing the pitch of the turbine blades to be varied. The pitch of the blades is turned in such a way as to create braking of the wind turbine.

Other known systems utilize mechanical brakes, such as disclosed in U.S. Patent Application Publication No. US 2005/0034937. Yet other systems disclose the use of aerodynamic-type brakes as well as mechanical brakes, for example, as disclosed in U.S. Pat. No. 6,265,785, to protect the wind turbine from over speed.

While mechanical brakes do an adequate job of protecting the wind turbine generator from over speed, mechanical braking systems do little to optimize the operational time and thus power output of the wind turbine generator. Moreover, such mechanical braking systems are mechanically complex and are, thus, relatively expensive.

As such, electrical braking systems have been developed to control over speed of wind turbine generator systems. For example, Japanese Patent Publication JP2000-179446 discloses an electrical braking system known as a Brake Relay for a wind turbine generator. The system disclosed in the Japanese patent publication includes a Brake Relay whose contacts are connected across the output terminals of the generator. In this application, since the speed of the turbine is proportional to the voltage at the generator output, the generator voltage is used to trigger this system. When an over speed condition (i.e. over voltage) is detected, the Brake Relay is energized which, in turn, shorts out the output terminals of the generator, which loads the generator and causes it to slow down and stop.

Such Brake Relays are known to be under the control of a Brake Relay Control Circuit, which actuates the Brake Relay as a function of a voltage representative of the generator output voltage. As mentioned above, output voltage of the generator is a cubic function of the wind. Thus, wind gusts are known to cause the generator voltage to rise high enough to trip the Brake Relay, thus causing a disruption of power delivered to the AC power grid.

Referring to FIG. 1, a conventional wind turbine generator system 20 is illustrated, generally identified with the reference numeral 20. The wind generator system 20 includes a generator 22, such as, a self-excited DC generator, a wind turbine (not shown) and an inverter 28 and generator protection circuitry. The wind turbine functions as a prime-mover for the generator 22. The generator 22 generates a DC voltage across its output terminals 24, 26 as a cubic function of the wind. In as much as the generator 22 is directly coupled to the wind turbine, the rotational speed of the turbine and generator is directly proportional to the wind speed. As such, the output voltage at the generator terminals 24 and 26 is a cubic function of the wind speed.

The output terminals 24, 26 of the generator 22 are coupled to an inverter, shown within the block 28. The inverter 28 converts the DC output voltage, available at the output terminals 24, 26 of the generator 22, to an AC voltage suitable for connection to a utility AC power grid, generally identified with the reference numeral 30. The AC power grid 30 may be a phase to phase 230/240 Volts AC, suitable for residential, commercial and industrial application. In the exemplary embodiment shown, shown, the inverter 28 generates a phase to phase voltage across two output phases $L_1$ and $L_2$, for example, 230/240 Volts AC.

Depending on the configuration of the utility AC power grid 30, the inverter 28 may also include a ground conductor for use with utility AC power grids which are 230/240 Volts AC with a center tap ground, for providing 230/240 Volts AC phase to phase and 115/120 Volts AC phase to ground. In such a system, the inverter ground conductor (not shown) would be electrically coupled to the utility center tap ground. The wind turbine generator systems 20 may be configured to be connected to various configurations of the utility AC power grid 30.

The phase to phase output $L_1$ and $L_2$ Of the inverter 28 is connected to the utility AC power grid 30 by way of an AC grid relay 32. As mentioned above, the grid relay 32 is used, among other things, to disconnect the wind turbine generator system from the utility AC power grid 30 during abnormal conditions relating to the voltage, phase or frequency of the AC power grid 30. The grid relay 32 is under the control of an AC Relay Control Circuit 34. The AC Relay Control Circuit 34 monitors the phase of the output of the inverter 28 and the phase of the utility AC power grid 30. When the phase of the inverter output is synchronized with the phase of the utility AC power grid 30, the AC Relay Control Circuit 34 causes the grid relay 32 to connect the two together.

In order to protect the wind turbine generator system 20 from damage from over speed resulting from wind gusts, as mentioned above, some wind turbine generator systems 20 include a Brake Relay 36. The Brake Relay 36 is connected across the output terminals 24, 26 of the generator 22. The Brake Relay 36 may be an electromechanical relay that shorts the output terminals 24, 26 of the generator 22 together for a nominal time period during an over speed condition. Shorting the terminals 24, 26 of the generator 22 together creates a load on the generator 22 and slows down and eventually stops the generator 22, thus acting as an electronic brake. In order to protect the generator from damage due to the variability of the wind speed, many known wind turbine generator systems 20, continuously monitor the output voltage of the generator 22 at a DC Measurement Point. When the output voltage of the generator 22 exceeds a predetermined threshold voltage, for example, 320 Volts DC ("first threshold"), indicative of an over speed condition, the conventional Brake Relay Control Circuit 38 activates the conventional Brake Relay 36, which shorts the terminals 24, 26 of the generator 22 and maintains the short circuit condition, thus shutting down the generator 22, for a nominal time period, such as 10 seconds or more, for example. This shut down condition causes the wind turbine generator system 20 to be off-line during a wind condition in which the system could be delivering maximum power to the utility AC power grid 30. As such, this condition makes wind turbine energy systems 20 less desirable as a renewable energy source.

In order to provide a protection system which minimizes the disruptions in power while still providing sufficient protection to the turbine-generator system, it is necessary to trigger a generator protection circuit based upon the over speed of the generator However, wind turbine generators are pole mounted. Thus any speed sensors to measure the speed of the turbine generator need to be mounted on the turbine-generator and cabled from the pole top mounted generator. Considering the number of wind turbine generators in a wind turbine generator farm, such cabling would substantially add to the cost of the overall wind turbine generator system. Thus, there is a need for protection circuitry for a wind turbine generator system that is triggered on over speed of the generator which does not require a sensor mounted on the turbine generator mounted on a pole top.

SUMMARY OF THE INVENTION

The present invention relates to a protection circuit for a wind turbine generator that includes a PWM Brake that works in conjunction with known Brake Relays. The Brake Relay is used to short the generator output terminals at a first threshold voltage. The PWM Brake includes one or more switching devices, coupled across the generator output. The PWM Brake is under the control of a PWM Brake Control Circuit which actuates the PWM Brake at a second threshold voltage that is relatively lower than the first threshold voltage. In accordance with an important aspect of the invention, the PWM Brake Control Circuit includes a novel speed sensing circuit for providing a signal representative of the speed of the turbine generator The novel speed sensing circuit eliminates the need to mount a speed sensor on the pole top mounted turbine generator. As such, the need for adding cabling from the pole top mounted wind turbine generator is eliminated. The novel speed sensing circuit provides a signal representative of the rotational speed of the turbine generator based upon the duty cycle of a pulse width modulated (PWM) signal that is derived from the drive signal developed by the PWM Control Circuit. This signal is used to alternatively actuate and close the Brake Relay to minimize actuation of the centrifugal switch.

DESCRIPTION OF THE DRAWING

These and other advantages of the present invention will be readily understood with reference to the following specification and attached drawing wherein.

DETAILED DESCRIPTION

Figure 1:
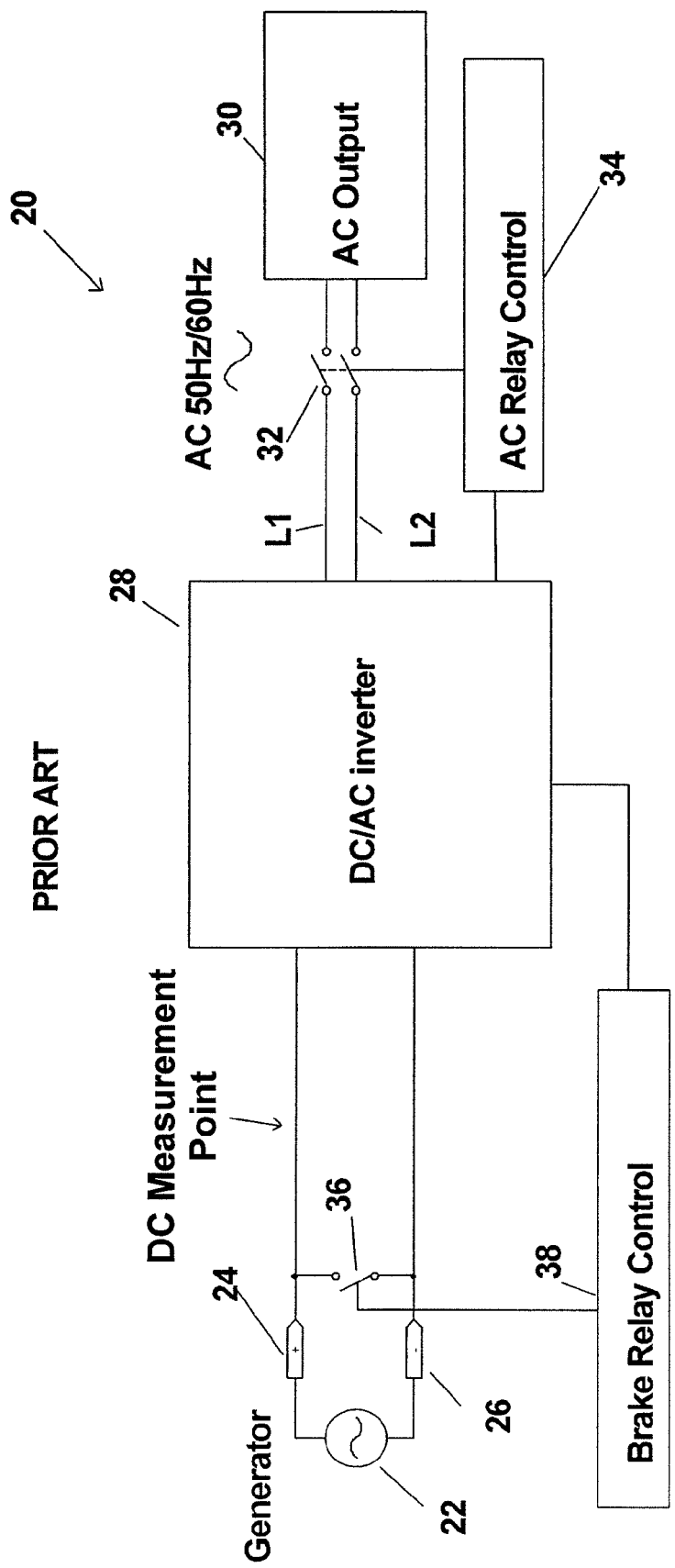
FIG. 1 is a block diagram of a wind turbine generator system Illustrating a known Brake Relay coupled across the generator output.
Figure 2:
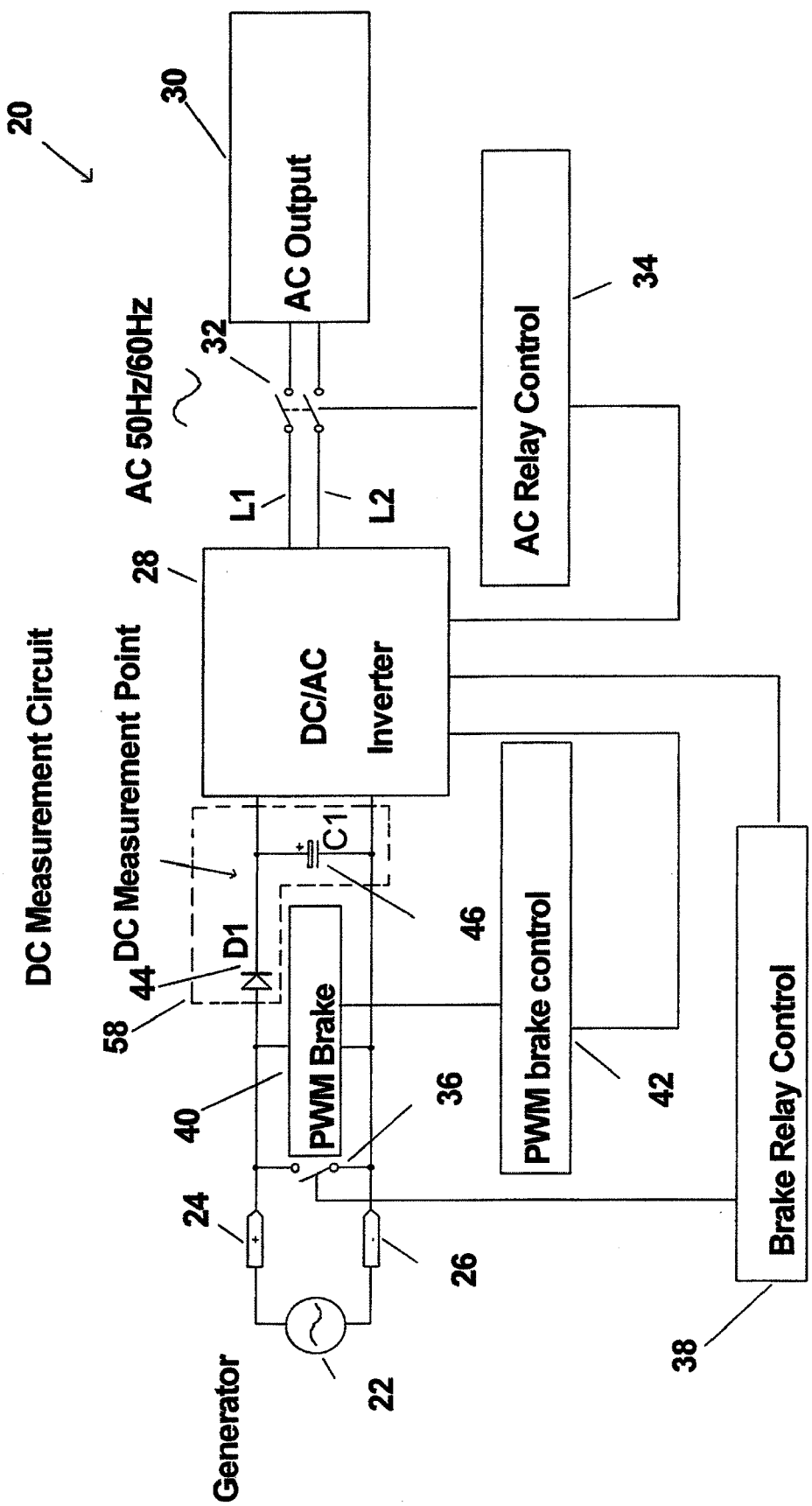
FIG. 2 is a block diagram of a wind turbine generator system, similar to FIG. 1, that additionally incorporates a PWM Brake coupled across the generator output under the control of a PWM Brake Control Circuit in accordance with the present invention.
Figure 3:
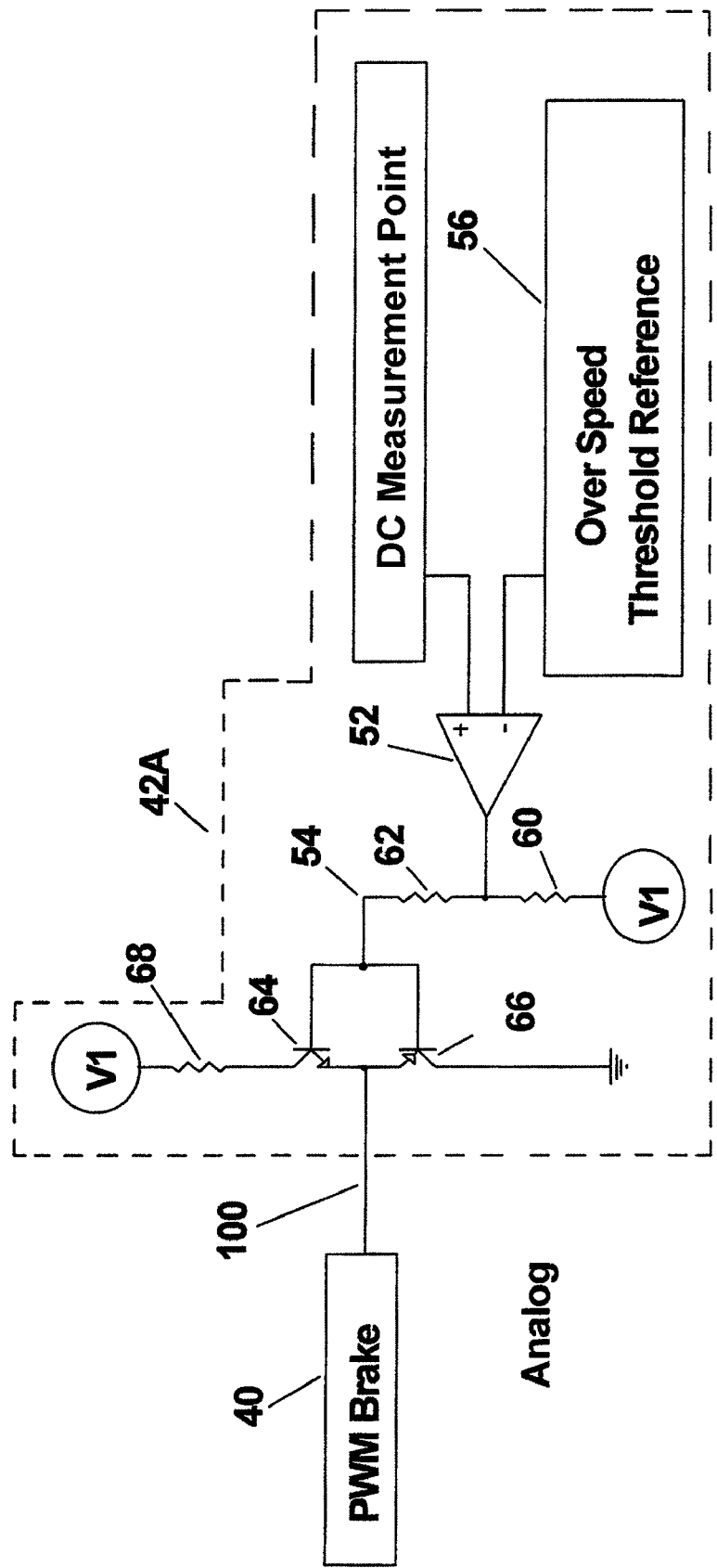
FIG. 3 is a schematic diagram of an analog embodiment of the PWM Brake Control Circuit in accordance with the present invention minus the novel speed sensing circuit.
Figure 4:
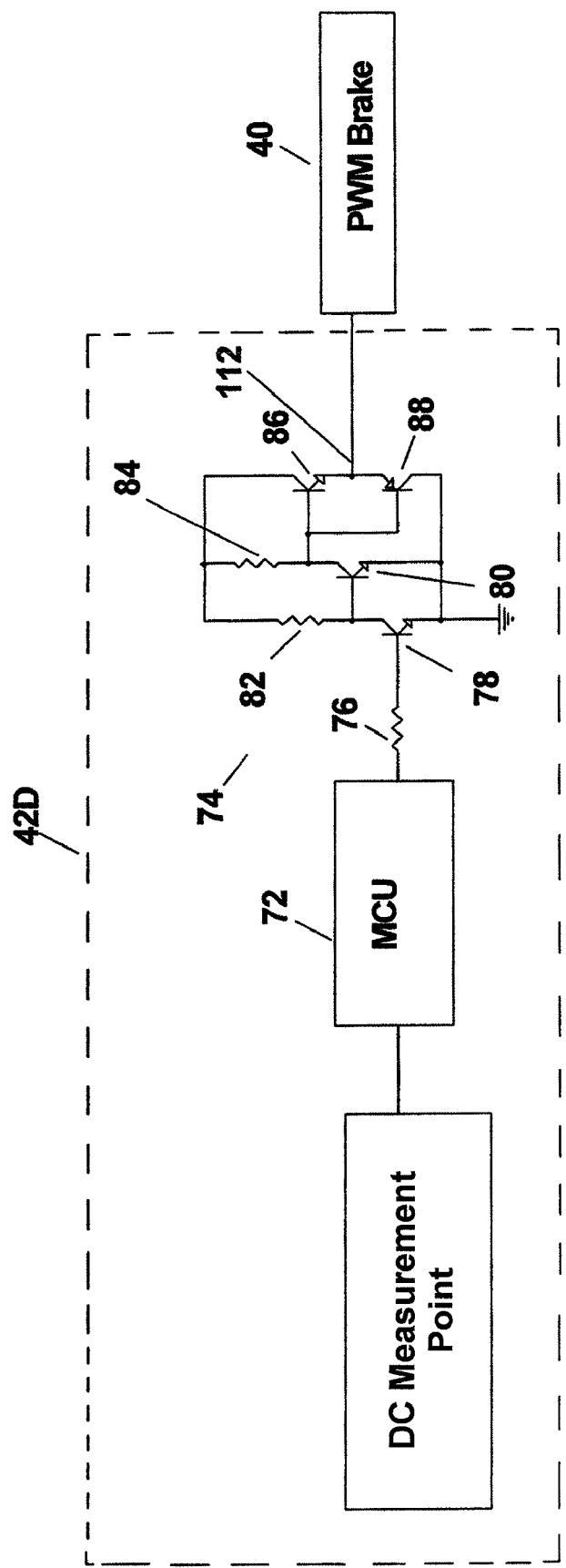
FIG. 4 is similar to FIG. 3 but illustrating a digital embodiment of the PWM Brake Control Circuit in accordance with the present invention minus the novel speed sensing circuit.
Figure 5:
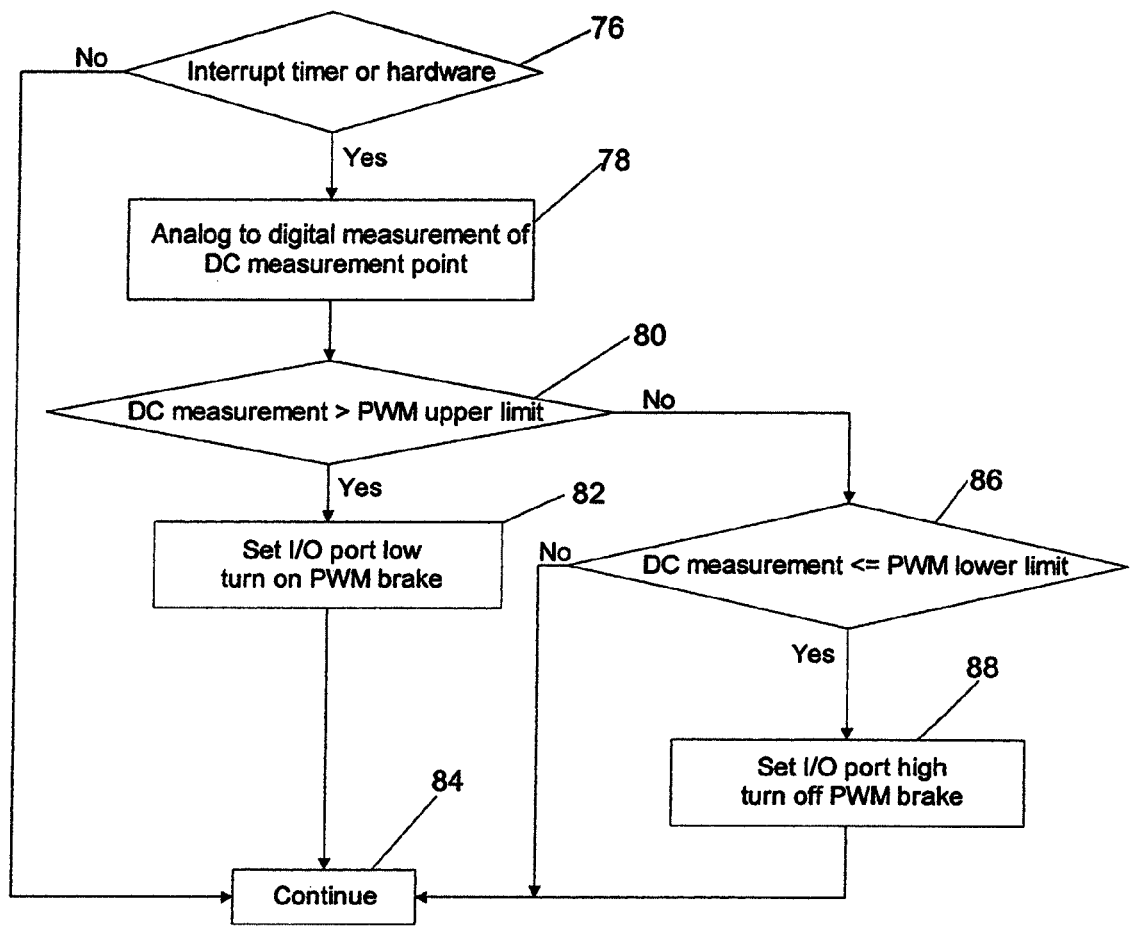
FIG. 5 is a flow chart for the embodiment illustrated in FIG. 4
Figure 6:
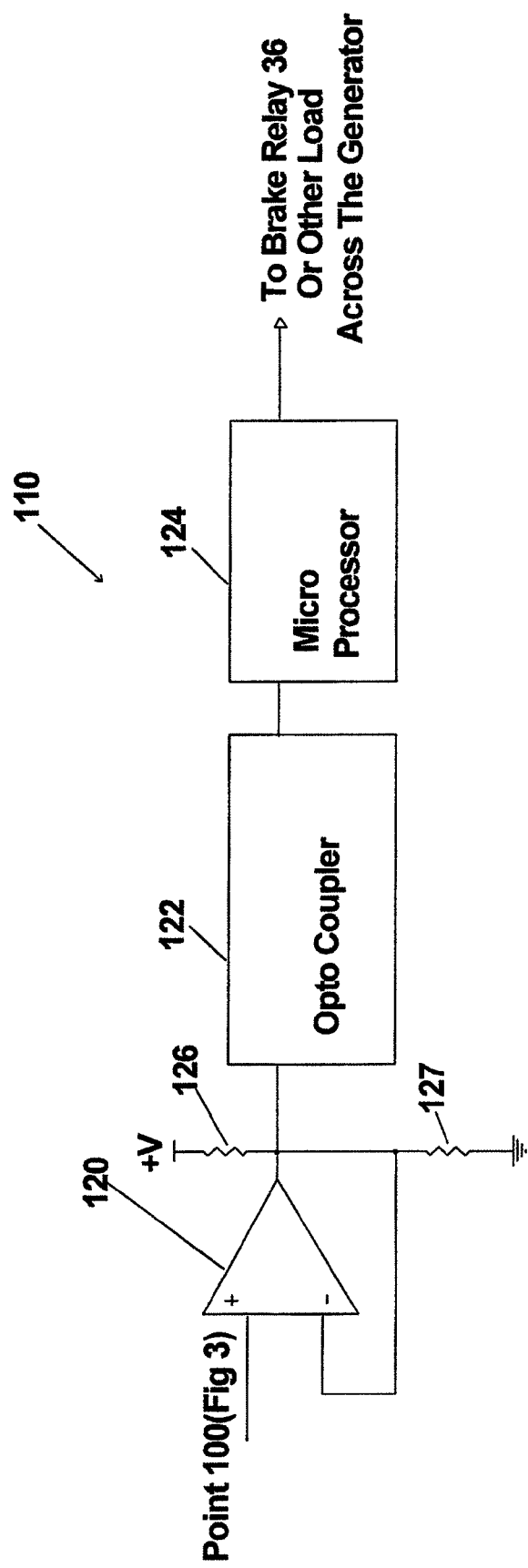
FIG. 6 is a block diagram of the novel speed sensing circuit for use with the PWM Brake Control Circuit in accordance with the present invention.
Figure 7:
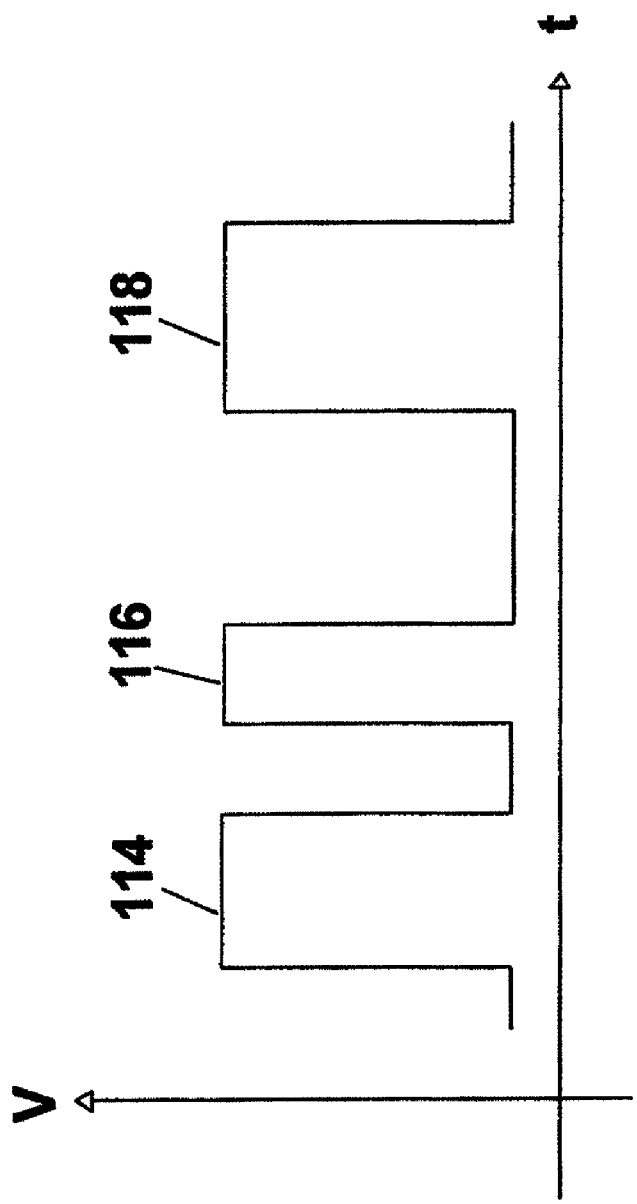
FIG. 7 is an exemplary graphical illustration of the output signal to a PWM Brake Control Circuit, illustrated in FIGS. 2-5.
Figure 8:
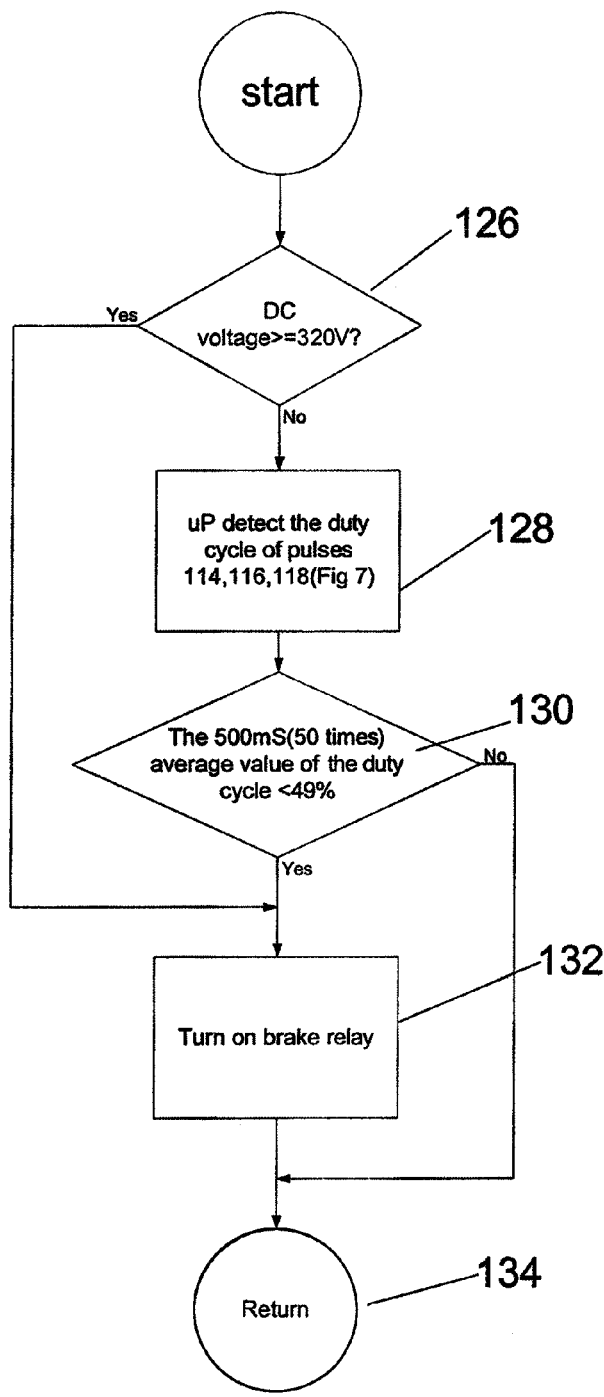
FIG. 8 is an exemplary flow chart for use with the PWM Brake Control Circuit in accordance with the present invention.

FIG. 1 is a block diagram of a wind turbine generator system 20 that incorporates a prior art Brake Relay 36 for electronically braking the generator. 22. FIG. 2 is a block diagram of a wind turbine generator system 20 that incorporates a prior art Brake Relay 36 for electronically braking the generator 22 and additionally incorporates a PWM Brake 40 that is coordinated with the prior art Brake Relay 36. FIGS. 3-5 relate to a PWM Brake Control Circuit 42 minus the novel speed sensing circuit in accordance with the present invention. FIGS. 6-8 relate to the novel speed sensing circuit in accordance with the present invention.

As mentioned above, some known systems utilize a brake relay, used to short out the wind turbine generator output for a nominal period, such as 10 seconds or more, any time the generator voltage exceeds a threshold level indicative of an over speed condition (i.e "first threshold voltage"). Thus, during conditions when high wind speeds exist and the opportunity to export maximum power, the brake relay in known wind turbine generator systems shuts down the generator for nominal time periods. The PWM Brake Control Circuit 42 with a novel speed sensing circuit in accordance with the present invention solves this problem by applying electronic braking to the generator when the output voltage of the generator voltage exceeds a second predetermined threshold voltage indicative of an over speed condition, hereinafter referred to as "the second threshold voltage". The second threshold voltage is selected to be relatively lower than the first threshold voltage, used to trigger a conventional Brake Relay 36. As such, the PWM Brake Control Circuit 42 minimizes the operation of the Brake Relay 36, thereby maximizing the power output of the generator 22 over time making such wind turbine generator systems 20 much more practical as a renewable energy source. In order to further optimize the power output to the AC power grid, the PWM Brake Control Circuit 42 includes a novel speed sensing circuit which actuates the PWM Brake Relay 40 upon detection of a generator over speed condition. The novel speed sensing circuit is described below in connection with FIGS. 7 and 8.

Referring to FIG. 2, a protection circuit for a wind turbine generator system 20 is illustrated. The protection system includes a conventional Brake Relay 36, a conventional Brake Relay Control Circuit 38, a PWM Brake 40, a PWM Brake Control Circuit 42, a DC Measurement circuit 58, for example, a diode 44 and a capacitor 46, an inverter 28, a grid relay 32 and a AC Relay Control Circuit 34.

As shown, the wind turbine generator system 20 also includes an inverter 28. Inverters are extremely well known in the art and are used to convert DC electrical power to AC electrical power. Various inverters 28 may be used with the present invention. Exemplary inverters which may be used are disclosed in U.S. Pat. Nos. 5,552,712; 5,907,192 and 6,256,212 and US Patent Application Publication No. US 2005/0012339 A1, all hereby incorporated by reference.

The PWM Brake 40 is a switching device that is electrically coupled across the generator output to short out the generator which provides electronic braking. The PWM Brake 40 is under the control of a PWM Brake Control Circuit 42. The PWM Brake Control Circuit 42 incorporates the novel speed sensing circuit for actuating the Brake Relay 38 during an over speed condition of the generator 22. In accordance with an important aspect of the invention, the novel speed sensing circuit is able to provide a signal representative of generator over speed without the need to locate a speed sensor on the pole top mounted turbine generator.

With reference to FIG. 2, the PWM Brake Control Circuit 42 is used to control a pulse width modulated (PWM) Brake 40 that is also coupled across the output terminals 24, 26 of the generator 22 and is in parallel with the Brake Relay 36. As discussed in more detail below, the PWM Brake 40 is a switching device, such as a FET. The PWM Brake Control Circuit 42 continuously monitors the generator output voltage at the DC Measurement Point and compares the generator output voltage with the second threshold voltage, for example, 300 Volts DC, relatively less than the first threshold voltage used to trigger the brake relay 36. Thus, when the generator output voltage exceeds the second threshold voltage but is less than the first threshold voltage, the PWM Brake Control Circuit 42 causes the PWM Brake 40 to short out the generator output to slow down the generator 22. The second threshold voltage is selected to slow down the generator 22 and prevent operation of the Brake Relay 36. As such, the PWM Brake 40 and the PWM Brake Control Circuit 42 are designed to minimize if not eliminate operation of the Brake Relay 36, thus optimizing the operation of the wind turbine generator system 20 and maximizing the power exported to the utility AC power grid 30.

The DC output voltage of the generator 22 may be measured by a DC Measurement Circuit 58 or a sensor. In particular, the DC Measurement Circuit 58 may include a diode 44 and a capacitor 46. With such a configuration, the DC Measurement Point (i.e. cathode of the diode 44 is separated from the generator 22 by way of the diode 44. The measurement side of the diode 44 may be coupled to relatively large metal film hold up capacitor 46, for example, 1000 microfarads, which holds the generator output voltage relatively constant during measurement once the capacitor 46 is fully charged defining the DC Measurement Point. When the generator output voltage at the DC Measurement Point reaches a predetermined voltage (i.e. the second threshold voltage), the PWM Brake Control Circuit 42 generates a drive signal to actuate the PWM Brake 40. As will be discussed in more detail below, the PWM Brake 40 may be configured as an n-channel MOSFET, coupled across the generator output terminals 24, 26. In such a configuration, the drive signal from the PWM Brake Control Circuit 42 is applied to the gate terminal of the n-channel MOSFET. When the drive signal is pulled high, the MOSFET is turned on. This condition looks like a short to the generator 22. The short across the generator 22 slows the turbine down with a corresponding decrease in the generator output voltage. At this point, the voltage from the generator 22 falls below the voltage of the DC Measurement Point (i.e. the voltage on the capacitor 46). This condition back biases the series diode 44, effectively isolating the generator 22 from the DC Measurement Point. The hold up capacitor 46, coupled to the DC measurement point, is used to supply current to a fly back section of the inverter 28 during a flyback mode. While the capacitor 46 supplies current to the inverter 28, the voltage at the DC Measurement Point (i.e. voltage on the capacitor 46) will decrease to a point below the value of the second threshold voltage. When the voltage on the capacitor 46 drops below the second threshold voltage, the PWM Control circuit 42 generates a low signal that is applied to the gate of the MOSFET causing the MOSFET to turn off. Once the MOSFET is turned off, the turbine can now spin freely under just inverter loading and the DC input voltage from the generator will change according to the available wind speed.

The ramp-up voltage of the generator 22 is moderated by the load presented to the generator 22 through recharge of the holdup capacitor 46. The recharge time of the capacitor 46 allows ample time for the MOSFET to turn off. The effect is to set up a PWM regulator whose duty cycle is inversely proportional to the DC voltage. The controlled voltage allows for the generator 22 to operate under a much wider band of wind speed than would normally be possible with the electromechanical method.

FIG. 3 illustrates an exemplary analog embodiment of a PWM Brake Control Circuit, shown within the dashed box 42A, is used to control the PWM Brake 40, as described above. The PWM Brake Control Circuit 42A is an analog circuit and includes a comparator 52 and a driver circuit, generally identified with the reference numeral 54. The second threshold voltage or reference 56 is applied to an inverting input of the comparator 52. The generator output (i.e.

cathode of the diode 44), identified in FIG. 3 as the DC Measurement Point, is applied to a non-inverting input of the comparator 52.

The generator output voltage may alternatively be sensed by a sensor or virtually any means for providing a signal representative of the generator output voltage. For example, the sensors may include a step down transformer.

When the output voltage of the generator 22 at the DC Measurement Point exceeds the second threshold voltage or Reference 56, the output of the comparator 52 goes high, thus actuating the PWM Brake 40 to effectively short the output terminals 24, 26 of the generator 22. As mentioned above, the output of the comparator 52 will remain high until the voltage on the capacitor 46 (FIG. 2) drops below the second threshold voltage or Reference 56 plus the hysteresis set up on the comparator 120 and the resistors 126 and 127 to add dead band to limit the frequency of the PWM Brake 40 turning on and off. At that point, the output of the comparator 52 will go low, thus providing PWM control of the PWM Brake 40.

The output of the comparator 52 may be applied to a driver circuit 54. The driver circuit 54 illustrated in FIG. 3 is merely exemplary and includes a pair of serially coupled resistors 60 and 62. The output of the comparator 52 is applied to a node defined between the serially coupled resistors 60, 62. One resistor is coupled to a voltage source V1. The resistors 60 and 62 act as a voltage divider to pull up the output of the comparator 52 to a predetermined value. The driver circuit 54 also includes a pair of complementary bipolar junction transistors 64 and 66 connected in a push-pull configuration. More particularly, the transistor 64 is a NPN transistor while the transistor 66 is a PNP. The bases and emitters of the transistors 64 and 66 are coupled together. The collector of the transistor 64 is pulled high by way of a pull up resistor 68. The collector of the transistor 66 is pulled low and is connected to ground. The emitters of the transistors 64 and 66 are coupled to the PWM Brake 40.

In operation, when the output of the comparator 52 is low, the PNP transistor 66 is turned on, connecting the PWM Brake 40 n channel FET gate to ground, in which case n-channel MOSFETS used as the PWM Brake 40, remain off. When the output of the comparator 52 goes high, the PNP transistor 66 turns off and the NPN transistor 64 turns on. This causes the PWM Brake to be pulled high, thus causing the n-channel MOSFET, used for the PWM Brake 40 to be turned on, effectively shorting the generator 22.

An exemplary alternate digital embodiment of the PWM Brake Control Circuit is illustrated in FIG. 4 and generally identified with the reference numeral 42D. The PWM Brake Control Circuit 42D is used to control the PWM Brake 40. The PWM Brake Control Circuit 42D includes a microprocessor 72 and a driver circuit 74. A flow diagram for the microprocessor is illustrated in FIG. 5. The voltage at the DC Measurement Point (i.e. voltage at the cathode of the diode 44, as illustrated in FIG. 2) is monitored by the microprocessor 72.

Referring to FIG. 5, monitoring of the voltage at the DC Measurement Point may be interrupt driven, as indicated by step 76. Upon an interrupt, the analog DC voltage from the DC Measurement Circuit 58 is converted to a digital value by an on-board analog to digital converter (not shown), as indicated in step 78. The system then checks in step 80 if the value of the voltage at the DC Measurement Point is greater than a PWM upper limit (i.e. second threshold voltage plus a constant). If so, the PWM Brake 40 is actuated in step 82 and the n-channel MOSFET is turned on to short the generator 22. The system then continues its processing in step 84 after servicing the interrupt.

If the system determines in step 80 that the voltage at the DC Measurement Point is not greater than the PWM upper limit (i.e. second threshold voltage plus a constant), the system checks in step 86 whether the voltage at the DC Measurement Point is less than or equal to a PWM lower limit (i.e. over speed threshold minus a constant) in step 86. If not, the system returns to step 84 and continues its processing. If it is determined in step 86 that the voltage at the DC Measurement Point is less than the PWM lower limit, for example, due to a voltage on the capacitor 46, the PWM Brake 40 is turned off in step 88. The upper and lower PWM limits are used to set the duty cycle of the PWM.

The driver circuit 74 (FIG. 4) includes a current limiting resistor 76, a pair of BJTs 78, 80, configured as a voltage enhancement circuit, a pair of load resistors 82, 84 coupled to the collector terminals of the transistors 78 and 80 and a pair of complementary BJTs, 86, 88, connected in a push-pull configuration. The base and emitter terminals of the transistors 86 and 88 are coupled together. The base terminals of the transistors 86 and 88 are coupled to the collector of the NPN transistor 80. The emitter terminals of the transistors 86 and 88 are tied to the PWM Brake 40. The emitter terminals of the NPN transistors 78 and 80 are connected to ground.

In operation, whenever the microprocessor 74 outputs a high signal on its I/O port, the NPN transistor 78 is turned on, the NPN transistor 80 is turned off, connecting the base terminal of the PNP transistor 88 and the base terminal of the PNP transistor 86 to the high DC rail by way of the resistor 84, thus turning off the PNP transistor 88 and turning on the NPN transistor 86. As mentioned above, the PWM Brake 40 may be configured as an n-channel MOSFET. As such when the NPN transistor 86 is turned on, the MOSFET will be turned on. Thus allowing it to turn on and connect the positive voltage DC voltage rail to the DC Brake 40. This causes the n-channel MOSFET, used as the PWM Brake 40, to turn on. Alternatively, when the I/O port of the microprocessor 72 is forced low, the NPN transistor 78 is turned off and the PNP transistor 80 is turned on. During this condition, the base of the transistor 86 goes to Vce Saturation the transistor 88 is turned on and the MOSFET will be turned off.

In accordance with an important aspect of the invention, the Brake Relay 36 is configured to trip or short the generator 22 at a speed set point, relatively less than the speed at which the mechanical centrifugal switch, discussed above, actuates. By setting the speed set point lower than the speed of the centrifugal switch. The Brake Relay 36 is able slow the generator 22 down, for example, by way of the Brake Relay Control circuit 38, as discussed above, prior to the rotational speed of the turbine generator reaching the speed at which the centrifugal switch operates, thus minimizing if not eliminating the operation of the mechanical over protection system and the need for manual reset of such systems.

In practical operation, however, the PWM Brake Control Circuit effectively clamps the DC voltage at the DC measurement point to the level of the second threshold voltage. The subsequent action of the PWM Control Circuit tends to make the DC voltage of this DC measurement point not change with increasing the wind speed. In times of wind gusts, the generator can continue to increase in speed while the PWM control Circuit clamps the DC voltage to the second threshold level. In such circumstances, it is possible for the generator speed to exceed the set limits of the centrifugal brake before the Brake Relay is activated since the DC voltage is clamped below the first threshold voltage of the Brake Relay. Hence, there is a need for an additional method to control the Brake Relay before the centrifugal brake threshold is reached. One method to resolve this would be to monitor the speed of the generator however, this would require adding cables to the generator.

In order to avoid the need for cabling between the remote wind turbine generator, normally pole mounted, and the PWM Brake Control Circuit 42, a novel speed sensing circuit, generally identified with the reference numeral 110 (FIG. 6), may be used which provides a signal representative of the speed of the turbine generator. This signal is based upon based upon the duty cycle of a pulse width modulated (PWM) signal that is derived from the generator output voltage, that is available at the PWM Brake Control Circuit 42, discussed above (i.e point 100, FIG. 3 or point 112, FIG. 4). As shown in FIG. 7, the input signal to the PWM Brake 40, developed by the PWM Brake Control Circuit 42, is a train of pulses 114, 116 and 118 having a certain magnitude and varying pulse widths or duty cycles depending on the wind speed and the second threshold voltage or reference 56. As mentioned above the second threshold voltage or reference 56 is based upon the over speed condition which causes the PWM Brake 40 to actuate prior to the Brake Relay 36 Thus, in order to coordinate the operation of the PWM Brake 40 with the Brake Relay 36 and the centrifugal switch, mentioned above, the pulses 114, 116 and 118 are fed into the speed sensing circuit 110. In particular, the speed sensing circuit 110 is configured to provide a speed set point below the speed set point of the centrifugal switch. This speed set point is used to trip the Brake Relay 36.

With such a configuration, the protection of the generator 22 is well coordinated. In particular, as the speed of the generator 22 increases, the PWM Brake 40 will actuate at the lowest speed set point (i.e. second threshold voltage). As mentioned above, the PWM Brake causes the generator output voltage to be clamped at the second threshold voltage. As further mentioned above, it is possible for the speed of the generator 22 to exceed the set point of the centrifugal switch causing the centrifugal switch to trip before the Brake Relay 36 is actuated since the DC voltage is clamped below the first threshold voltage. In order to prevent this condition in which the centrifugal switch trips before the Brake Relay 36, the Brake Relay 36 is actuated at the first threshold voltage or whenever the speed of the generator 22 exceeds the speed set point as generated by the speed sensing circuit 110. Whenever, either of those conditions are detected by the microprocessor 124 (FIG. 6), a signal is generated by the microprocessor 124 to actuate and close the Brake Relay 36.

In accordance with an aspect of the invention, the duty cycle of the pulses 114, 116 and 118 is used to provide a signal representative of the speed of the generator. In particular, as discussed above, the duty cycle of the input pulses to the PWM Brake 40 represent braking periods by the PWM Brake 40. The longer braking periods represent higher wind speeds and thus higher speeds of the generator 22. As such, the duty cycle of the pulses 114, 116 and 118 can be used to generate a signal representative of the speed of the generator 22. This signal can be used to actuate the Brake Relay 36 or other load across the generator windings to slow the generator down and prevent actuation of the centrifugal switch.

The speed sensing circuit 110 includes a comparator 120, an opto-coupler or other isolation device 122 and a microprocessor 124. The input to the PWM Brake 40 (i.e. point 100, FIG. 3 or point 112, FIG. 4) is applied to a non-inverting input of the comparator 120. The output of the comparator 120 is tied to ground by way of a grounding resistor 127 and shorted to the inverting terminal and pulled high by way of a pull-up resistor 126. When the PWM Brake 40 is off, the input to the non-inverting input is low, causing the opto-coupler 122 to be off, for example, causing the input to the microprocessor 124 to be high. When the wind speed picks up, turning on the PWM Brake 40, the input to the PWM Brake 40 toggles from low to high, causing a high input to the non-inverting terminal of the comparator 120 causing the output of the comparator 120 to toggle high, which turns on the opto-coupler 122 and causes it drive the input to the microprocessor 124 low.

The microprocessor 124 can now measure the duty cycle of these cycles as a signal representative of the speed of the generator 22. The microprocessor 124 can compare the speed representative signal with a threshold signal to initiate activation of the Brake Relay 36 or other load across the generator 22 at a speed relatively less than the speed at which the centrifugal switch operates. Referring to FIG. 8, the system initially checks in step 126 the DC voltage at the DC Measurement Point (FIG. 1) If the DC voltage is greater than the first threshold value, for example, 320 Volts DC, the system proceeds to step 132 and closes the Brake Relay 36. If not, the system measures the time of the duty cycle of the input pulses 114, 116 and 118 at the input of the Brake Relay 36 in step 128. In step 130, the system checks whether the length of time of the duty cycle is less than a predetermined speed threshold value, for example, whether the 500 ms average value of the duty cycle is less than, for example, 49%. The predetermined speed threshold value is determined experimentally to be a value less than the speed at which the centrifugal switch, mentioned above, operates. If the measured duty cycle, which represents the speed of the generator 22, is less than the predetermined speed threshold value, i.e. 49%, indicating that the generator is in an over speed condition, the system proceeds to step 132 and actuates and closes the Brake Relay 36. If not, the system returns to step 134.

Figure 9A:
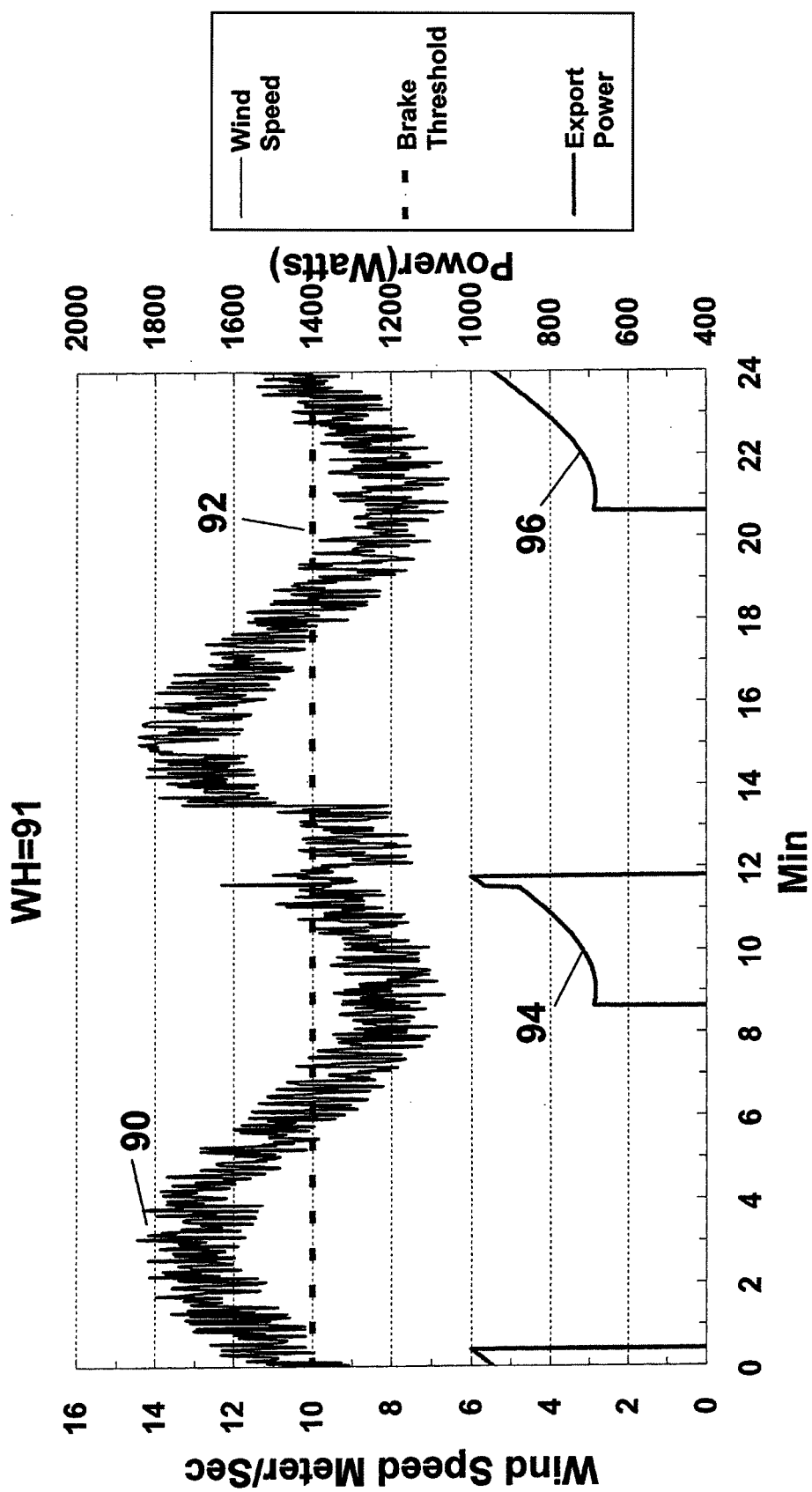
FIG. 9A is a graphical illustration of wind speed and power output of a wind turbine generator as a function of time for a wind turbine generator system that utilizes a Brake Relay as illustrated in FIG. 1.
Figure 9B:
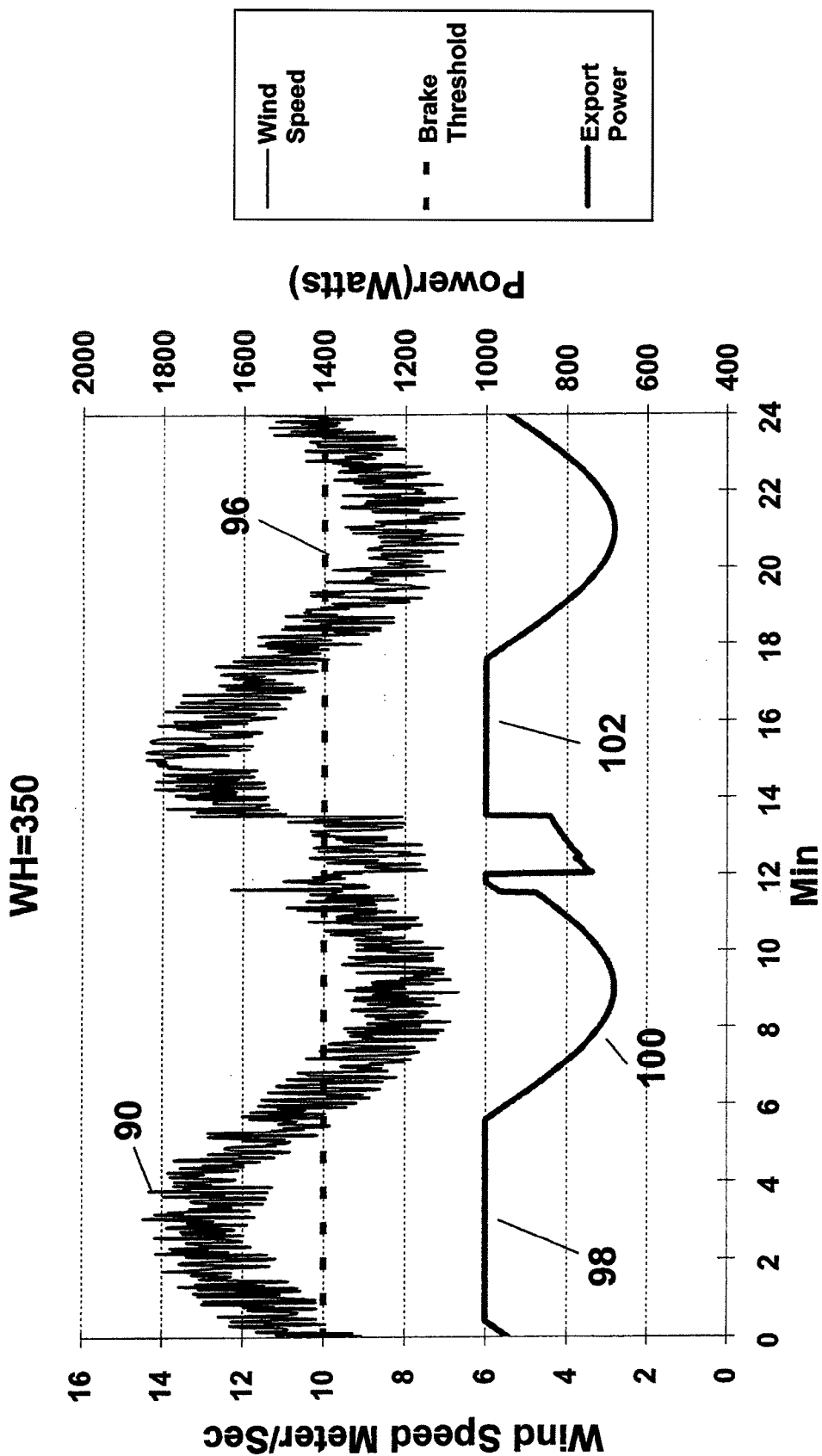
FIG. 9B is similar to FIG. 9A but illustrates power output an exemplary power output curve for the generator as a function of time for a wind turbine generator control system which includes the PWM Brake Control Circuit with a novel speed sensing circuit in accordance with the invention.

FIG. 9A illustrates the power exported by a conventional wind turbine generator system 20 as illustrated in FIG. 1. FIG. 9B illustrates the power exported by the wind turbine generator system 20. Referring first to FIG. 9A, the curve 90 is an exemplary curve of the wind speed as a function time. The line 92 represents the lockout threshold value, for example, 10 meters per second. As shown, as the wind speed increases above the first threshold, the Brake Relay 36 shorts out the generator 22 resulting in no power being exported to the utility AC power grid 30 for a nominal period of 10 seconds or more. After the nominal period expires, as the wind speed drops below the threshold 92, the wind turbine generator system 20 exports power, as indicated by the curve 94, until the wind speed goes above the lockout threshold 92. As shown in FIG. 9A, this occurs at about 12 minutes. The wind turbine generator system 20 is again shut down for a nominal period. After the second shutdown period, as the wind speed drops below the shutdown threshold, the wind turbine generator system again begins exporting power at about 21 minutes, as indicated by the curve 96. Thus for the 24 minute time period illustrated in FIG. 9A, the total power exported to the utility AC power grid 30 is the sum of the areas under the curves 94 and 96. For the exemplary data indicated in FIG. 9A, the total power exported is 91 watts-hours.

FIG. 9B illustrates the power exported by a wind turbine generator system 20. utilizing the PWM Brake 40 and the PWM Brake Control Circuit with novel speed sensing in accordance with the present invention. For the same wind speed curve 90 illustrated in FIG. 9A. In this case, the dotted line 96 represents the over speed threshold, for example 10 meters per sec. The over speed threshold is selected to be lower than the shutdown threshold. As shown, any time the wind speed exceeds the over speed threshold 96, the PWM Brake 40 electronically brakes the generator 22 to allow maximum power, for example, 1000 watts, to be exported by the generator from about 0.5 minutes to about 6 minutes, as indicated by the segment 98 of the curve 100. With the conventional system, as illustrated in FIG. 9A, the wind turbine generator system was shut down during this same time period and exported no power. As the wind speed drops off during the time period from about 6 minutes to 12 minutes, the power exported drops below the maximum as a function of the wind speed. From 14 minutes to 18 minutes, the system exports maximum power, as indicated by the line segment 102. During this same time period, the conventional wind turbine generator system 20 was shut down because the wind speeds exceeded the first threshold and thus exported no power during this period. From 18 minutes to 24 minutes, the wind turbine generator system 20 exported power to the utility AC power grid 30 as a function of the wind speed, which remained below the lockout threshold and the over speed threshold. The total power exported by the wind turbine generator is 350 Watt-hours, significantly higher than the conventional system illustrated in FIGS. 1 and 9A.

The PWM Brake 40 and the PWM Brake Control Circuit 42 in accordance with the present invention is configured to coordinate with mechanical over speed protection systems in order to minimize operation of such systems and thus reduce the need for cumbersome physical resets of such systems. In accordance with another important aspect of the invention, the PWM Brake Control Circuit 42 may incorporate a speed sensing circuit for providing a signal representative of the speed of the turbine generator. In order to avoid adding cabling from the remote wind turbine generator, the speed sensing circuit may be configured to determine the rotational speed of the turbine generator based upon the duty cycle of a pulse width modulated (PWM) signal, available at the output of the PWM Brake Control Circuit 42, discussed above.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. An over speed control circuit for a wind turbine generator system having a generator for generating an output voltage as a function of the speed of the generator, said generator having at least one pair of output terminals, a brake relay coupled across said output terminals and a brake relay control circuit for causing said brake relay to lockout for a predetermined time period any time the output voltage of said generator exceeds a first threshold and short out said generator output terminals until said predetermined time period has elapsed, the over speed control circuit comprising:

a sensor for sensing the generator output voltage at the output terminals of said generator;

a switch coupled across the output terminals of said generator which closes in response to a control signal; and a control circuit, responsive to said sensor, for generating a control signal to close said switch when said generator output voltage is greater than a second threshold and generating a control signal to open said switch when said generator output voltage drops below said second threshold defining a pulse width modulated (PWM) control signal, said second threshold being less than said first threshold.

2. The over speed control circuit as recited in claim 1, wherein said control circuit is an analog circuit.

3. The over speed control circuit as recited in claim 1, wherein said control circuit is a digital circuit.

4. A wind turbine generator system comprising:

a wind turbine generator for generating a DC output voltage, said generator having at least one pair of output terminals an over speed control circuit for said generator, said over speed control circuit comprising:

a measurement circuit for sensing the generator output voltage at the output terminals of said generator;

a switch coupled across the output terminals of said generator which closes in response to a control signal;

a control circuit, responsive to said sensor, for generating a control signal to close said switch when said generator output voltage is greater than a first threshold and generating a control signal to open said switch when said generator output voltage drops below said first threshold defining a pulse width modulated (PWM) control signal;

an inverter for converting said DC output voltage from said generator to an AC voltage; and a brake relay connected across said generator output terminals for shorting said output terminals of said generator and a brake relay control circuit for causing said brake relay to lockout for a predetermined time period any time the output voltage of said generator exceeds a second threshold and short out said generator output terminals until said predetermined time period has elapsed, wherein said first threshold is relatively less than said second threshold.

5. The wind turbine generator system as recited in claim 4, wherein said measurement circuit includes a diode serially coupled to one of said output terminals of said generator, wherein said anode is coupled to said generator.

6. The wind turbine generator system as recited in claim 5, wherein said measurement circuit further includes a capacitor coupled across said output terminals of said generator.

7. The wind turbine generator system as recited in claim 5, wherein said control circuit is an analog circuit.

8. The wind turbine generator system as recited in claim 6, wherein said control circuit is a digital circuit.

* * * * *